Figure 1:
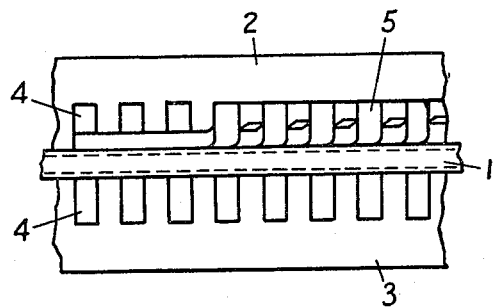

Jan. 12, 1960  A. S. FENEMORE ET AL  2,920,571
ELECTRO-MAGNETIC DEVICES

Filed May 1, 1953  2 Sheets-Sheet 1

CONDUCTOR      R R B B Y Y R R B B Y Y R R B B Y Y R R B B Y Y
ARRANGEMENT        R R B B Y Y R R B B Y Y R R B B Y Y R R B B Y Y

SLOT NUMBER  1 2 3 4 5 6 7 8 9 10 11 12 13 14 15 16 17 18 19 20 21 22 23 24 25 26 27 28 29

Jan. 12, 1960   A. S. FENEMORE ET AL   2,920,571
ELECTRO-MAGNETIC DEVICES

Filed May 1, 1953   2 Sheets-Sheet 2

United States Patent Office 2,920,571
Patented Jan. 12, 1960

2,920,571

ELECTRO-MAGNETIC DEVICES

Alan Stephen Fenemore and Albert Benjamin John Reece, Stafford, England, assignors to The English Electric Company Limited, London, England, a British company Application May 1, 1953, Serial No. 352,552

Claims priority, application Great Britain May 23, 1952

4 Claims. (Cl. 103—1)

This invention relates to electro-hydraulic pumps for pumping electrically conducting liquid of the kind including two magnetic cores with a pumping duct therebetween, and means for producing a travelling magnetic field which passes through the pumping duct in a direction perpendicular to its axis.

It is known, in connection with such pumps, to use a conventional induction motor type double layer distributed polyphase winding for producing the travelling magnetic field. With such a winding, however, the poles at opposite ends of the core will be of opposite polarity, that is to say, if there is a North pole at one end of the core there will be a South pole at the other end, and vice versa.

The result of this is that, at any instant in each cycle, the positive and negative areas between the magneto-motive force curve and the magneto-motive force zero will not be equal so that the excess of flux from the two end poles will return over the intermediate poles as a pulsating flux which adds little to the thrust obtained but which appreciably increases the losses.

An object of the present invention is to provide an improved form of pump in which this pulsating component of flux is substantially reduced.

In the pump according to the invention, at least one of the magnetic cores is slotted so as to form $2n+1$ poles, $n$ being a whole number, and the core is provided with a $2n$ pole winding spread over the whole of the slots so that each of the two end poles has the same polarity and is only half wound.

In such an arrangement, at every instant of each cycle substantially equal positive and negative areas are obtained under the magneto-motive force curve whilst zero magneto-motive force is obtained at the ends of the core; the pulsating component of flux is therefore substantially reduced.

The second core may also be slotted and, if desired, provided with a winding similar to that of the first core, the two windings being connected together so that their ampere turns are additive. The windings may be wound for any desired number of phases and may have any desired number of turns per coil and slots per pole per phase. They may be either full pitch or short chorded.

Figure 2:
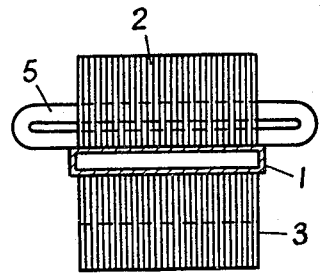
Figure 3:
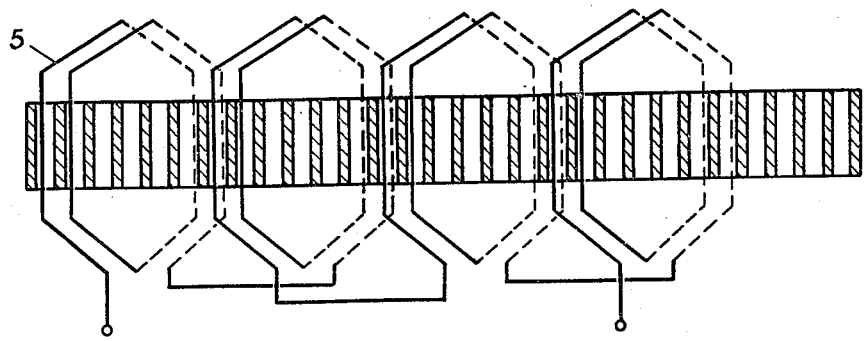
Figure 4:
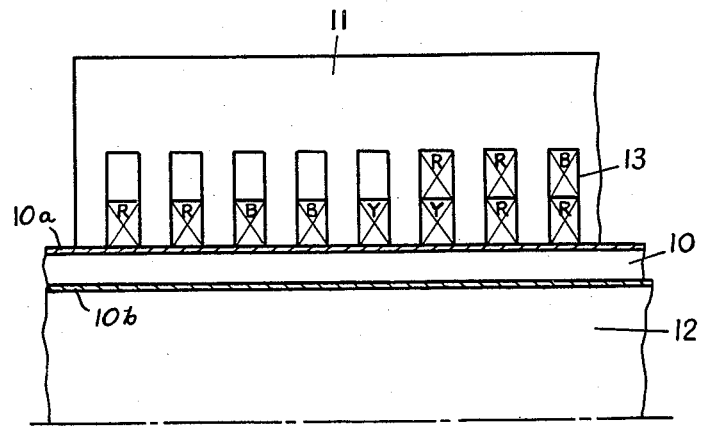
Figure 5:
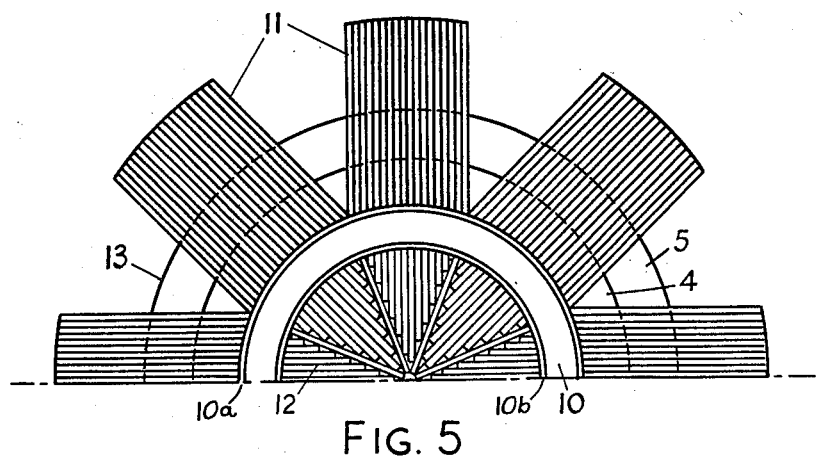

Other features of the invention will appear from the following description with reference to the accompanying drawings. Fig. 1 is a part front elevation of an electro-hydraulic pump embodying the invention for electrically conducting liquids, whilst Fig. 2 is a sectional elevation on Fig. 1. Fig. 3 shows the winding diagram for the pump. Fig. 4 shows a sectional side elevation of an alternative form of pump embodying the invention, whilst Fig. 5 is a part end view on Fig. 4.

Referring now to Figs. 1 and 2 of the drawings, the pump comprises a thin rectangular pipe 1 of a nickel chromium steel through which the electrically conducting liquid is to be pumped, and two laminated cores indicated at 2 and 3. Both cores are slotted at 4 transversely to the axis of the pipe to form $2n+1$ poles, $n$ being equal to 2, and the core 2 is provided with a distributed winding 5.

As will be seen from Fig. 3, the winding 5 is a double-layer three phase winding with six slots per pole, one turn per coil, the coils being short chorded by one slot pitch. The winding is wound for four poles (i.e. $2n$ poles) and is spread over the whole of the slots. The three phases are indicated in this figure by the letters R, B and Y respectively, and it will be noted that the two end poles have the same polarity and are only half wound, one phase only of the winding diagram being shown in its entirety for the sake of simplicity.

In operation the winding produces a magnetic field which is linked with the structure 3 and passes through the electrically conducting liquid in the pipe in a direction perpendicular to the axis of the pipe. This field travels axially relative to the pipe with a velocity of $2fp$ cms./sec., where $f$ is the frequency of the supply in cycles per second and $p$ is the pole pitch in centimetres, and induces eddy current in the electrically conducting liquid in a plane perpendicular both to the axis of the pipe and to the magnetic field. These eddy currents react with the magnetic field to produce a force tending to cause the liquid to flow through the pipe in the same direction as the magnetic field.

Referring now to Figs. 4 and 5, the alternative form of pump according to the invention comprises an annular duct 10 formed by two concentrically spaced tubes 10a and 10b, an outer magnetic core consisting of blocks of axially extending laminations 11 disposed around the outer tube 10a and an inner core consisting of further blocks of axially extending laminations 12 disposed inside the inner tube 10b. The laminations of the outer core are, as before, slotted transversely to the axis of the duct to form $2n+1$ poles, and a $2n$ pole winding 13 similar to that shown in Fig. 3, except that the coils are annular in form and are connected together to give the desired slot pitch, is spread over the whole of the slots. This form of pump works in exactly the same way as the pump described with reference to Figs. 1 to 3, the winding 13 producing a travelling magnetic field which passes through the liquid in the duct 10 to link with the inner core whereby eddy currents are induced in the liquid which react with the magnetic field to produce a force tending to cause the liquid to flow axially through the duct.

What we claim as our invention and desire to secure by Letters Patent is:

1. An electro-hydraulic pump for electrically conducting liqiuds comprising, in combination, two laminated magnetic cores, a pumping duct extending between the cores, one of the cores being slotted transversely so as to form $2n+1$ poles, $n$ being a whole number, and a $2n$ pole double layer distributed polyphase winding spread over the whole of the slots so that each of the two end poles has the same polarity and is only half wound, said winding being effective, when energized from a polyphase A.C. source, to produce a travelling magnetic field which passes through the pumping duct in a direction perpendicular to its axis and which links with the other of the two cores.

2. An electro-hydraulic pump for electrically conducting liquids comprising, in combination, two laminated magnetic cores, a pumping duct extending between the cores, each of the cores being slotted transversely so as to form $2n+1$ poles, $n$ being a whole number, and a $2n$ pole double layer distributed polyphase winding spread over the whole of the slots of one of said cores so that each of the two end poles has the same polarity and is only half wound, said winding being effective, when energized from a polyphase A.C. source, to produce a travelling magnetic field which passes through the pumping duct in a direction perpendicular to its axis and which links with the other of the two cores.

3. An electro-hydraulic pump for electrically conducting liquids comprising, in combination, two laminated magnetic cores, a pumping duct extending between the cores, each of the cores being slotted transversely so as to form $2n+1$ poles, $n$ being a whole number, and a $2n$ pole double layer distributed polyphase winding for each core, each winding being spread over the whole of the slots of the respective core so that each of the two end poles has the same polarity and is only half wound, the two windings being effective, when energized from a polyphase A.C. source in a sense such that their ampere turns are additive, to produce a travelling magnetic field which passes through the pumping duct in a direction perpendicular to its axis and which links with the other of the two cores.

4. An electro-hydraulic pump for electrically conducting liquids comprising, in combination, inner and outer concentric tubes arranged to provide an annular pumping duct therebetween, an outer magnetic structure disposed around the outer tube, an inner magnetic structure disposed within the inner tube, said outer magnetic structure being slotted transversely so as to form $2n+1$ poles, $n$ being a whole number, and a $2n$ pole double layer distributed polyphase winding spread over the whole of the slots so that each of the two end poles has the same polarity and is only half wound, said winding being effective, when energized from a polyphase A.C. source, to produce a travelling magnetic field which passes through the pumping duct in a direction perpendicular to its axis and which links with the other of the two cores.

References Cited in the file of this patent
UNITED STATES PATENTS

| | | |
|---|---|---|
| 1,298,664 | Chubb | Apr. 1, 1919 |
| 2,397,785 | Friedlander | Apr. 2, 1946 |
| 2,558,698 | Wade | June 26, 1951 |
| 2,658,452 | Donelian | Nov. 10, 1953 |
| 2,702,004 | Blake et al. | Feb. 15, 1955 |
| 2,764,095 | Baker | Sept. 25, 1956 |

FOREIGN PATENTS

| | | |
|---|---|---|
| 10,948 | Great Britain | Dec. 31, 1914 |
| 543,214 | Germany | June 4, 1929 |
| 730,943 | Great Britain | June 1, 1955 |